United States Patent Office

3,707,364
Patented Dec. 26, 1972

3,707,364
BENZOISOTHIAZOLE HERBICIDES
Friedrich Becke, Heidelberg, Adolf Fischer, Mutterstadt, and Helmut Hagen, Ludwigshafen, Germany, assignors to Badische Anilin- & Soda-Fabrik Aktiengesellschaft, Ludwigshafen (Rhine), Germany
No Drawing. Filed Mar. 11, 1970, Ser. No. 18,689
Claims priority, application Germany, Mar. 26, 1969, P 19 15 387.8
Int. Cl. A01n 9/12
U.S. Cl. 71—90     1 Claim

ABSTRACT OF THE DISCLOSURE

Herbicides containing a compound having the formula

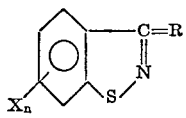

where X and R each denotes halogen or a nitro, thiocyano, amino, cyano or aliphatic radical, an alkylamino, acylamino, haloacylamino, alkoxy or a substituted ureido radical, R may also denote hydrogen or an aryl, aralkyl or cycloaliphatic radical, and $n$ denotes one of the integers 0, 1, 2 and 3, and a process for controlling the growth of unwanted plants with these compounds.

---

The present invention relates to herbicidal agents containing substituted 1,2-benzoisothiazoles.

It is known to use substituted 1,3-benzothiazolylureas as selective herbicides; however, the compounds are not sufficiently herbicidally active and their selectivity is not satisfactory.

We have now found that substituted 1,2-benzoisothiazoles having the general formula

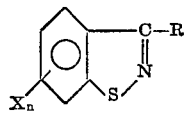

where X and R each denotes halogen (chlorine, bromine) or a nitro, thiocyano, amino, cyano or aliphatic radical (methyl, ethyl, propyl, butyl, isopropyl, isobutyl), alkylamino, propylamino, butylamino, dimethylaminopropylamino, hexylamino, dodecylamino), acylamino (formylamino, acetylamino, diacetylamino), haloacylamino (chloroacetylamino, chloroacetylmethylamino, dichloroacetylamino, dichloroacetylmethylamino), alkoxy (methoxy, ethoxy, propoxy, butoxy) or substituted ureido radical (N,N-dimethylureido, N,N-dimethyl-N'-methylureido, N-phenylureido, N-chlorophenylureido), and R may also denote hydrogen or an aryl (phenyl, chlorophenyl), aralkyl (benzyl, chlorobenzyl) or cycloaliphatic (cyclohexyl, cyclooctyl) radical and $n$ denotes one of the integers 0, 1, 2 and 3, have a good herbicidal action.

The 1,2-benzoisothiazoles may be prepared by conventional methods. It is known e.g. from the periodical "Angew. Chem.," vol. 36, p. 159 (1923) and from "Ber.," vol. 58, p. 2,095 (1925) to react thionaphthene-2,3-dione with ammonia and hydrogen peroxide to give 3-carbamyl-1,2-benzoisothiazole and to obtain therefrom, by hydrolysis and decarboxylation, 1,2-benzoisothiazole.

Furthermore, the reaction of 2-formyl-4-nitrophenylsulfonyl bromide with ammonia to give 5-nitro-1,2-benzoisothiazole is described in "Ber.," vol. 56, p. 1,630 (1923) and in "Liebigs Annalen der Chemie," vol. 454, p. 264 (1927).

It is also possible to produce benzoisothiazoles by cyclization of o-mercaptophenylcarbonyl compounds in the presence of polyphosphoric acid ("Ann. Chim.," vol. 53, No. 5, pp. 577–587 (1963)).

4-chloro-1,2-benzoisothiazole, for example, is obtained particularly advantageously and economically by reaction of 2,6-dichlorobenzal chloride with ammonia and elementary sulfur.

The substituted 1,2-benzoisothiazoles may be obtained by reaction of chloro-1,2-benzoisothiazoles with chlorine, bromine, alkali metal thiocyanates, alkali metal cyanides, alkali metal alcoholates, ammonia, primary and secondary amines, and also by reaction of 3-amino-1,2-benzoisothiazoles with isocyanates or dialkylcarbamic acid chlorides or by nitrating chloro-1,2-benzoisothiazoles.

Production of 4-chloro-1,2-benzoisothiazole

In an enamelled pressure vessel, 115 parts (by weight) of 2,6-dichlorobenzal chloride, 16 parts of sulfur and 60 parts of ammonia in 125 parts of benzene are heated for 3 hours at 130° to 150° C. After flashing, the autoclave discharge is filtered and the filtrate washed with 200 parts of hot benzene. The filtrate consists of ammonium chloride. The combined filtrates are freed from benzene and subsequently fractionally distilled at subatmospheric pressure. 61 parts of 4-chloro-1,2-benzoisothiazole having a melting point of 42° to 44° C. (boiling point (2 mm.): 95°–100° C.) is obtained. The yield, with reference to 2,6-dichlorobenzal chloride, is 72% of the theory.

Production of 3,4-dichloro-1,2-benzoisothiazole 170 parts of 4-chloro-1,2-benzoisothiazole is dissolved in 300 parts of glacial acetic acid. At 50° C. and over a period of 30 minutes, 75 parts of chlorine is passed into this solution. The end product is precipitated in crystalline form during the reaction. After suction filtration and drying, 183 parts (90% of the theory) of 3,4-dichloro-1,2-benzoisothiazole having a melting point of 130° C. (boiling point (11 mm.): 165°–167° C.) is obtained.

Production of 3-methoxy-4-chloro-1,2-benzoisothiazole

In a stirred vessel, 41 parts of 3,4-dichloro-1,2-benzoisothiazole is heated at 60° C. for 5 hours with 50 parts of 30% sodium methylate in 100 parts of methanol. After cooling to approx. 10° C., the precipitated substance is suction filtered, washed with water until free from chloride and recrystallized from ethyl acetate. 35 parts (87% of the theory) of 3-methoxy-4-chloro-1,2-benzoisothiazole having a melting point of 112° C. is obtained.

Production of 3-amino-4-chloro-1,2-benzoisothiazole

In a pressure vessel, 123 parts of 3,4-dichloro-1,2-benzoisothiazole is reacted with 35 parts of ammonia in 300 parts of formamide. The reaction mixture is kept at 130° to 140° C. for about 30 minutes, the initial pressure of approx. 8 atmospheres gauge reducing to approx. 3 atmospheres gauge. After cooling and flashing, the reaction product is suction filtered, washed with water and dried. 100 parts (90% of the theory) of 3-amino-4-chloro-1,2-benzoisothiazole having a melting point of 162° C. is obtained.

4-chloro-5-bromo-1,2-benzoisothiazole may be obtained by simple bromination of 4-chloro-1,2-benzoisothiazole in glacial acetic acid.

The following active ingredients are examples of the compounds according to the invention:

4-chloro-5-bromo-1,2-benzoisothiazole, M.P.=102° C.
4-chloro-7-bromo-1,2-benzoisothiazole, M.P.=179° C.
4-chloro-7-nitro-1,2-benzoisothiazole, M.P.=150° C.
4,5-dichloro-7-nitro-1,2-benzoisothiazole,
  M.P.=139° to 141° C.
3-dimethylamino-4-chloro-1,2-benzoisothiazole, B.P.
  (1 mm.)=120° to 121° C.

3-morpholinyl-4-chloro-1,2-benzoisothiazole,
M.P.=122° C.
3-(γ-dimethylaminopropyl-)amino-4-chloro-1,2-benzo-
isothiazole, M.P.=54° C.
3-amino-4,5-dichloro-1,2-benzoisothiazole, M.P.=173° C.
3-(γ-dimethylaminopropyl-)amino-4,5-dichloro-1,2-
benzoisothiazole, M.P.=60° C.
3-formylamino-4-chloro-1,2-benzoisothiazole,
M.P.=135° C.
3-diacetylamino-4-chloro-1,2-benzoisothiazole,
M.P.=108° C.
3-(N-propylureido)-4-chloro-1,2-benzoisothiazole,
M.P.=78° C.
3-(N-phenylureido-)-chloro-1,2-benzoisothiazole,
M.P.=186° C.
4-cyclohexylamino-7-nitro-1,2-benzoisothiazole,
M.P.=210° C.
4-diethylamino-7-nitro-1,2-benzoisothiazole,
M.P.=192° C.
4-dodecylamino-7-nitro-1,2-benzoisothiazole,
M.P.=105° C.
3-isobutoxy-4-chloro-1,2-benzoisothiazole,
M.P.=84° to 85° C.
3-ethoxy-4-chloro-1,2-benzoisothiazole, M.P.=93° C.
4-ethoxy-7-nitro-1,2-benzoisothiazole, M.P.=120° C.
4-n-butoxy-7-nitro-1,2-benzoisothiazole, M.P.=75° C.

The agents according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydro-naphthalene or alkylated naphthalenes, or organic liquids having boiling points higher than 150° C. and one or more than one functional group, e.g. the keto group, ether group, ester group or amide group, this group being attached as substituent to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. diatomaceous earth, talc, clay or fertilizers.

The active ingredients according to the invention may be mixed with insecticides, fungicides, bactericides, growth regulators and other herbicides.

The following examples illustrate the application of the active ingredients according to the invention.

EXAMPLE 1

In a greenhouse, loamy sandy soil is filled into pots and sown with the seeds of wheat (*Triticum sativum*), barley (*Hordeum vulgare*), Indian corn (*Zea mays*), rice (*Oryza sativa*), slender foxtail (*Alopercurus myosur-oides*), (*Apera spica-venti*), annual bluegrass (*Poa annua*), orchard grass (*Dactylis glomerata*), barnyard grass (*Echinochloa crus-galli*) and small-flower umbrella plant (*Cyperus difformis*). The soil prepared in this manner is then treated with 3 kg. per hectare of 3,4-dichloro-1,2-benzoisothiazole I and, for comparison, with 3 kg. per hectare of 1,3-dimethyl-3-(2-benzothiazolyl)-urea II, these amounts of the active ingredients each being dispersed in 500 liters of water per hectare. After 4 weeks it is ascertained that active ingredient I has a stronger herbicidal action and better crop plant compatibility than II.

The results of the experiment are given in the following table:

|  | Active ingredient | |
| --- | --- | --- |
|  | I | II |
| Wheat | 0 | 10 |
| Barley | 10 | 10–20 |
| Indian corn | 0 | 10–20 |
| Rice | 10–20 | 30–40 |
| Slender foxtail | 100 | 70–80 |
| Silky bent grass | 100 | 70–80 |
| Annual bluegrass | 90–100 | 80 |
| Orchard grass | 90–100 | 80 |
| Barnyard grass | 80 | 30–40 |
| Smallflower umbrella plant | 90–100 | 30 |

NOTE.—0=No action; 100=Complete destruction.

The action of the following active ingredients corresponds to that of I:

4-chloro-5-bromo-1,2-benzoisothiazole;
4-chloro-7-bromo-1,2-benzoisothiazole;
4,5-dichloro-1,2-benzoisothiazole;
4,7-dichloro-1,2-benzoisothiazole.

EXAMPLE 2

The plants Indian corn (*Zea mays*), slender foxtail (*Alopecurus myosuroides*), silky bent grass (*Apera spica-venti*), annual bluegrass (*Poa annua*), orchard grass (*Dactylis glomerata*), barnyard grass (*Echinochloa crus-galli*) and smallflower unbrella plant (*Cyperus difformis*) are treated at a growth height of 3 to 15 cm. with 3 kg. per hectare of 3,4-dichloro-1,2-benzoisothiazole I and, for comparison, with 3 kg. per hectare of 1,3-dimethyl-3-(2-benzothiazolyl)-urea II, these amounts of the active ingredients each being dispersed in 500 liters of water per hectare.

After 3 to 4 weeks, the results contained in the following table are obtained:

|  | Active ingredient | |
| --- | --- | --- |
|  | I | II |
| Indian corn | 0–10 | 30–40 |
| Slender foxtail | 90–100 | 80–90 |
| Silky bent grass | 90–100 | 80 |
| Annual bluegrass | 90–100 | 80 |
| Orchard grass | 100 | 80 |
| Barnyard grass | 90 | 70 |
| Smallflower umbrella plant | 90 | 30–40 |

NOTE.—0=No action; 100=Complete destruction.

The action of the following active ingredients corresponds to that of I:

4-chloro-5-bromo-1,2-benzoisothiazole;
4-chloro-7-bromo-1,2-benzoisothiazole;
4,5-dichloro-1,2-benzoisothiazole;
4,7-dichloro-1,2-benzoisothiazole.

EXAMPLE 3

60 parts by weight of compound I from Example 1 is mixed with 40 parts by weight of N-methyl-α-pyrrolidone. A solution is obtained which is suitable for application in the form of very fine drops.

EXAMPLE 4

20 parts by weight of compound I from Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.2% by weight of the active ingredient.

EXAMPLE 5

20 parts by weight of compound I from Example 1 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 6

3 parts by weight of compound I from Example 1 is intimately mixed with 97 parts by weight of particulate koalin. A dust is obtained containing 3% by weight of the active ingredient.

EXAMPLE 7

30 parts by weight of compound I from Example 1 is intimately mixed with a mixture consisting of 92 parts by weight of powdered silica gel and 3 parts by weight of paraffin oil which has been sprayed onto the surface of this silica gel. A formulation of the active ingredient is obtained having good adherence.

We claim:

1. A process for controlling the growth of unwanted plants which comprises treating the loci of the unwanted plants with a herbicidally effective amount of 3,4-dichloro-1,2-benzoisothiazole.

References Cited

UNITED STATES PATENTS

| | | | |
|---|---|---|---|
| 2,653,865 | 9/1953 | Kasmin et al. | 71—90 |

FOREIGN PATENTS

| | | | |
|---|---|---|---|
| 429,476 | 5/1967 | Japan | 17—90 |
| 1,085,430 | 10/1967 | Great Britain | 71—90 |

LEWIS GOTTS, Primary Examiner

C. L. MILLS, Assistant Examiner

U.S. Cl. X.R.

260—304, 305, 306.6